(12) United States Patent
Hoke et al.

(10) Patent No.: US 8,980,209 B2
(45) Date of Patent: Mar. 17, 2015

(54) CATALYST COMPOSITIONS, CATALYTIC ARTICLES, SYSTEMS AND PROCESSES USING PROTECTED MOLECULAR SIEVES

(71) Applicant: BASF Corporation, Florham Park, NJ (US)

(72) Inventors: Jeffrey B. Hoke, North Brunswick, NJ (US); Oleg Ilinich, Monmouth Junction, NJ (US); Michael Breen, Erie, PA (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/104,731

(22) Filed: Dec. 12, 2013

(65) Prior Publication Data

US 2014/0170044 A1      Jun. 19, 2014

Related U.S. Application Data

(60) Provisional application No. 61/736,377, filed on Dec. 12, 2012.

(51) Int. Cl.
| | |
|---|---|
| B01J 31/28 | (2006.01) |
| B01J 29/00 | (2006.01) |
| B01J 29/068 | (2006.01) |
| B01D 53/94 | (2006.01) |
| F01N 3/28 | (2006.01) |

(52) U.S. Cl.
CPC .............. *B01J 31/28* (2013.01); *B01D 53/945* (2013.01); *F01N 3/28* (2013.01); *F01N 2510/06* (2013.01); *Y10S 502/50* (2013.01); *Y10S 502/506* (2013.01); *Y10S 502/514* (2013.01); *Y10S 502/52712* (2013.01)
USPC .......... 423/213.2; 423/213.5; 60/274; 60/299; 502/1; 502/74; 502/87; 502/325; 502/439; 502/500; 502/506; 502/514; 502/527.12

(58) Field of Classification Search
USPC .......... 502/1, 74, 87, 325, 439, 500, 506, 514, 502/527.12; 423/213.2, 213.5; 60/274, 299
See application file for complete search history.

(56) References Cited

U.S. PATENT DOCUMENTS

| | | | | |
|---|---|---|---|---|
| 5,371,312 | A * | 12/1994 | Lago et al. ................ | 585/475 |
| 5,897,846 | A | 4/1999 | Kharas et al. | |
| 6,528,031 | B1 * | 3/2003 | Park et al. ................ | 423/239.2 |
| 6,641,788 | B1 | 11/2003 | Ogawa et al. | |
| 7,763,560 | B2 | 7/2010 | Horiuchi et al. | |
| 7,790,127 | B1 | 9/2010 | Lee et al. | |
| 7,824,639 | B2 | 11/2010 | Moroz et al. | |
| 8,741,800 | B2 * | 6/2014 | Elam et al. ................ | 502/216 |
| 2001/0053745 | A1 | 12/2001 | Kharas et al. | |
| 2002/0192515 | A1 | 12/2002 | Bachinger et al. | |
| 2006/0224032 | A1 * | 10/2006 | Janssen ................ | 585/639 |
| 2009/0155525 | A1 | 6/2009 | Li | |
| 2010/0092358 | A1 | 4/2010 | Koegel et al. | |
| 2010/0189615 | A1 | 7/2010 | Gramiccioni | |
| 2010/0303677 | A1 | 12/2010 | Henry et al. | |
| 2010/0316547 | A1 | 12/2010 | Justice et al. | |
| 2011/0005211 | A1 | 1/2011 | Tissler et al. | |
| 2011/0014099 | A1 | 1/2011 | Dornhaus et al. | |
| 2011/0044871 | A1 | 2/2011 | Maletz et al. | |
| 2012/0079817 | A1 | 4/2012 | Wei et al. | |
| 2012/0213674 | A1 | 8/2012 | Schuetze et al. | |
| 2013/0202509 | A1 | 8/2013 | Schuetze et al. | |

FOREIGN PATENT DOCUMENTS

| | | |
|---|---|---|
| CN | 1179463 | 4/1998 |
| CN | 101530787 | 9/2009 |
| DE | 102009053919 | 5/2011 |
| EP | 0248147 | 12/1987 |
| EP | 0645185 | 3/1995 |
| EP | 2275194 | 1/2011 |
| JP | 2002177788 | 6/2002 |
| JP | 2002273232 | 9/2002 |
| KR | 20090023786 | 3/2009 |
| WO | WO-97/00119 | 1/1997 |
| WO | WO-2007/093325 | 8/2007 |
| WO | WO-2007/107371 | 9/2007 |
| WO | WO-2008/022967 | 2/2008 |
| WO | WO-2009/049795 | 4/2009 |
| WO | WO-2009/118188 | 10/2009 |
| WO | WO-2009/120866 | 10/2009 |
| WO | WO-2010/083313 | 7/2010 |
| WO | WO-2010/083315 | 7/2010 |
| WO | WO-2010/083357 | 7/2010 |
| WO | WO-2011/057649 | 5/2011 |
| WO | WO-2011/082357 | 7/2011 |
| WO | WO-2012/055730 | 5/2012 |
| WO | WO-2012/059144 | 5/2012 |
| WO | WO-2012/059145 | 5/2012 |

* cited by examiner

OTHER PUBLICATIONS

Weuster-Botz, D. et al., Scale-up and application of a cyclone reactor for fermentation processes, *Bioprocesses Engineering* 18 1998, 433-438.

Non-Final Office Action in U.S. Appl. No. 14/104,716, dated Oct. 31, 2014, 14 pages.

*Primary Examiner* — Timothy Vanoy
(74) *Attorney, Agent, or Firm* — Melanie L. Brown

(57) ABSTRACT

Described are catalyst compositions, catalytic articles, methods of manufacturing catalytic articles and exhaust gas treatment systems and methods that utilize the catalytic articles. The catalyst composition comprises an oxidation catalyst comprising a washcoat layer including a platinum group metal supported on a refractory metal oxide support and porous molecular sieve particles having internal pores, the molecular sieve particles protected by a protecting material selected from an organic wax encapsulating the molecular sieve particles, a polymer encapsulating the molecular sieve particles, an inorganic oxide deposited on the surface of the molecular sieve particles, or an organic compound filling the internal pores of the molecular sieve particles, wherein the protecting material prevents interaction of the molecular sieve particles with the platinum group metal.

21 Claims, No Drawings

CATALYST COMPOSITIONS, CATALYTIC ARTICLES, SYSTEMS AND PROCESSES USING PROTECTED MOLECULAR SIEVES

CROSS-REFERENCE TO RELATED APPLICATIONS

This application claims priority under 35 USC §119(e) to U.S. Provisional Application No. 61/736,377, filed Dec. 12, 2012, the entire contents of which are is incorporated herein by reference.

TECHNICAL FIELD

The present invention pertains to the field of catalytic articles for the abatement of pollutants from the exhaust gas of internal combustion engines. Specific embodiments are directed to catalytic articles utilized for lean burn engines including a protected molecular sieve and a platinum group metal, wherein the molecular sieve is protected from contact with the platinum group metal.

BACKGROUND

Operation of lean burn engines, e.g., diesel engines and lean burn gasoline engines, provide the user with excellent fuel economy due to their operation at high air/fuel ratios under fuel lean conditions. Diesel engines, in particular, also offer significant advantages over gasoline engines in terms of their fuel economy, durability, and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others.

Oxidation catalysts comprising a precious metal dispersed on a refractory metal oxide support are known for use in treating the exhaust of diesel engines in order to catalyze the oxidation of both hydrocarbon and carbon monoxide gaseous pollutants to carbon dioxide and water. Such catalysts have been generally contained in units called diesel oxidation catalysts (DOC), or more simply catalytic converters, which are placed in the exhaust flow path from a Diesel-powered engine to treat the exhaust before it vents to the atmosphere. Typically, the diesel oxidation catalysts are formed on ceramic or metallic substrate carriers (such as the flow-through monolith carrier) upon which one or more catalyst coating compositions are deposited. In addition to the conversions of gaseous HC, CO and the SOF (Soluble Organic Fraction) of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, an adsorbent material, which may be a molecular sieve, for example, a zeolite, may be provided as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

One effective method to reduce $NO_x$ from the exhaust of lean-burn engines, such as gasoline direct injection and partial lean-burn engines, as well as from diesel engines, requires trapping and storing of $NO_x$ under lean burn engine operating conditions and reducing the trapped $NO_x$ under stoichiometric or rich engine operating conditions or lean engine operating with external fuel injected in the exhaust to induce rich conditions. The lean operating cycle is typically between 1 minute and 20 minutes and the rich operating cycle is typically short (1 to 10 seconds) to preserve as much fuel as possible. To enhance $NO_x$ conversion efficiency, short and frequent regeneration is favored over long but less frequent regeneration. Thus, a lean $NO_x$ trap catalyst generally must provide a $NO_x$ trapping function and a three-way conversion function.

Some lean $NO_x$ trap (LNT) systems contain alkaline earth elements. For example, $NO_x$ sorbent components include alkaline earth metal oxides, such as oxides of Mg, Ca, Sr and Ba. Other lean LNT systems can contain rare earth metal oxides such as oxides of Ce, La, Pr and Nd. The $NO_x$ sorbents can be used in combination with precious metal catalysts such as platinum dispersed on an alumina support in the purification of exhaust gas from an internal combustion engine.

A conventional LNT typically contains basic sorbent components (e.g., $BaO/BaCO_3$ and/or $CeO_2$) for $NO_x$ storage and platinum group metals (PGM, i.e., Pt, Pd and Rh) for catalytic $NO_x$ oxidation and reduction. The LNT catalyst operates under cyclic lean (trapping mode) and rich (regeneration mode) exhaust conditions during which the engine out NO is converted to $N_2$ as shown in equations 1-6:

$$\text{Lean condition: } 2NO + O_2 \rightarrow 2NO_2 \quad (1)$$

$$\text{(Trapping mode) } 4NO_2 + 2MCO_3 + O_2 \rightarrow 2M(NO_3)_2 + 2CO_2 \quad (2)$$

$$\text{Rich condition: } M(NO_3)_2 + 2CO \rightarrow MCO_3 + NO_2 + NO + CO_2 \quad (3)$$

$$\text{(Regeneration mode) } NO_2 + CO \rightarrow NO + CO_2 \quad (4)$$

$$2NO + 2CO \rightarrow N_2 + 2CO_2 \quad (5)$$

$$2NO + 2H_2 \rightarrow N_2 + 2H_2O \quad (6)$$

Molecular sieves such as zeolites are used in diesel oxidation catalyst (DOC) and, as noted above, in Lean $NO_x$ Trap (LNT) applications for the purpose of adsorbing hydrocarbons (HC) from the engine exhaust during startup of the vehicle when the catalyst is cold and unable to oxidize the hydrocarbons to $CO_2$ (cold start). When the temperature of the exhaust increases to the point when the precious metal in the catalyst becomes active, hydrocarbon is released from the molecular sieve and is subsequently oxidized to $CO_2$. There are numerous strategies and methods for combining zeolite and precious metal in a DOC or LNT catalyst formulation. For instance, molecular sieve can be combined in the same layer as the precious metal or separated into different layers. For DOC applications, Pt and Pd are frequently used platinum group metals for oxidation of carbon monoxide (CO) and hydrocarbons (HC) present in diesel engine exhaust. The choice of these active metals is due to a combination of performance (i.e. mixtures of Pt and Pd have improved performance when compared to Pt and Pd alone) and cost (i.e. the price of Pd is significantly less than that of Pt). A frequently used zeolite in diesel applications for HC adsorption is Beta zeolite due to its high capacity for storage of hydrocarbons typically found in diesel exhaust. However, when beta zeolite available from most commercial suppliers is combined with Pt/Pd DOC catalyst in the same slurry and coating layer, CO oxidation performance of the catalyst is reduced significantly compared to that of Pt/Pd DOC catalyst without zeolite addition. Although HC performance is improved due to the HC storage function of the zeolite, the CO performance is reduced due to a negative interaction between the Pt/Pd/alumina catalyst and zeolite. One method to avoid this negative interaction is to separate the Pt/Pd and zeolite into different coating layers. However, it is desirable for simplicity of slurry preparation and monolith coating to combine the Pt/Pd and zeolite in a single slurry and/or coating layer. In order to accomplish this, a new method for overcoming the negative interaction between Pt/Pd and zeolite on CO oxidation performance must be found.

SUMMARY

A first aspect of the present invention pertains to a catalyst composition. In embodiment one, a catalyst composition for the treatment of exhaust gas from an internal combustion engine containing hydrocarbons, carbon monoxide and nitrogen oxides comprises an oxidation catalyst comprising a washcoat layer including a platinum group metal supported on a refractory metal oxide support and further comprising porous molecular sieve particles having internal pores, the molecular sieve particles protected by a protecting material selected from an organic wax encapsulating the molecular sieve particles, a polymer encapsulating the molecular sieve particles, an inorganic oxide deposited on the surface of the molecular sieve particles, or an organic compound filling the internal pores of the molecular sieve particles, wherein the protecting material prevents interaction of the molecular sieve particles with the platinum group metal. Embodiment two is a modification of embodiment one wherein the platinum group metal comprises platinum and palladium. Embodiment three is a modification of embodiments one or two, wherein the internal combustion engine is a\n lean burn engine. Embodiment four is a modification of embodiments one through three, wherein the molecular sieve particles consist of primary crystallites or agglomerates with a size in the range of about 1 to 70 µm.

Embodiment five is a modification of embodiments one through four, wherein the molecular sieve particles consist of primary crystallites or agglomerates with a size in the range of about 10 to 50 µm. Embodiment six is a modification of embodiments one through five, wherein the molecular sieve particles are zeolites selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite and combinations thereof. Embodiment seven is a modification of embodiments one through six, wherein the organic wax or polymer is hydrophobic. Embodiment eight is a modification of embodiments one through seven, wherein the organic wax or polymer is selected from the group consisting of cellulosics, acrylates, polyvinylpyrrolidones and combinations thereof.

Embodiment nine pertains to a catalytic article for the treatment of exhaust gas from internal combustion engine containing hydrocarbons, carbon monoxide and nitrogen oxides comprising a carrier substrate having a length, an inlet end and an outlet end, an oxidation catalyst material on the carrier, the oxidation catalyst material including an oxidation catalyst comprising a washcoat layer including the catalyst composition of any of embodiments 1-8. Embodiment ten is a modification of embodiment nine, wherein the catalytic article utilizes a single washcoat layer.

Embodiment eleven pertains to a method of making a catalytic article for the treatment of exhaust gas from an internal combustion engine containing hydrocarbons, carbon monoxide and particulate matter, the method comprising: providing protected molecular sieve particles having internal pores by contacting the molecular sieve with a protecting material selected from an organic wax encapsulating the molecular sieve particles, a polymer encapsulating the molecular sieve particles, an inorganic oxide deposited on the surface of the sieve particles, or an organic compound filling the internal pores of the molecular sieve particles; mixing the protected molecular sieve particles in a slurry containing a platinum group metal on a refractory metal oxide support; and washcoating the slurry containing the protected molecular sieve particles and platinum group metal on a refractory metal oxide support in a single washcoat layer on a carrier substrate.

Embodiment twelve is a modification of embodiment eleven, wherein the molecular sieve particles consist of primary crystallites or agglomerates with a size in the range of about 1 to 70 µm. Embodiment thirteen is a modification of embodiments eleven or twelve, wherein the molecular sieve particles consist of primary crystallites or agglomerates with a size in the range of about 10 to 50 µm. Embodiment fourteen is a modification of embodiments eleven through thirteen, wherein the molecular sieve particles are zeolite particles selected from the group consisting of faujasite, chabazite, clinoptilolite, mordenite, silicalite, zeolite X, zeolite Y, ultrastable zeolite Y, ZSM-5, ZSM-12 e, SSZ-13, SAPO-5, SAPO-37, offretite, Beta zeolite and combinations thereof. Embodiment fifteen is a modification of embodiments eleven through fourteen further comprising the step of burning out protecting material from the molecular sieve particles.

Embodiment sixteen is a modification of embodiments eleven through fifteen, wherein the organic wax or polymer is hydrophobic. Embodiment seventeen is a modification of embodiments eleven through sixteen, wherein the organic wax or polymer is selected from the group consisting of cellulosics, acrylates, polyvinylpyrrolidones and combinations thereof. Embodiment eighteen is a modification of embodiments eleven through seventeen, wherein the platinum group metal is platinum and palladium.

Embodiment nineteen pertains to a method of treating exhaust gas from a lean burn engine containing hydrocarbons, carbon monoxide and nitrogen oxides comprising flowing the exhaust gas over a catalytic article in accordance with embodiments 9 and 10.

Embodiment twenty is a modification of embodiments nine through nineteen, wherein the catalyst article is selected from the group consisting of a lean $NO_x$ trap, a diesel oxidation catalyst and a catalyzed soot filter.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Embodiments of the invention are directed to catalytic articles including molecular sieves, exhaust gas systems, and methods of abating pollutants from exhaust gases using such catalytic articles. The catalytic articles are effective to destroy HC, CO and NOx from internal combustion engines. Specific embodiments are directed to catalytic articles and systems for the treatment of exhaust gas from lean burn engines as described above. The catalytic article comprises a carrier substrate having a length, an inlet end and an outlet end, an oxidation catalyst material on the carrier substrate, the oxidation catalyst material including an oxidation catalyst comprising a washcoat layer including a platinum group metal supported on a refractory metal oxide support and further comprising porous molecular sieve particles having internal pores, the molecular sieve particles protected by a protecting material selected from an organic wax encapsulating the molecular sieve particles, a polymer encapsulating the zeolite particles, or an organic compound filling the internal pores of the zeolite particles, wherein the protecting material prevents interaction of the zeolite particles with the platinum group metal.

Specific embodiments are directed to the use of protected molecular sieves for improved performance when combined with platinum group metals supported on refractory oxide support particles in the manufacture of DOC, CSF or LNT catalytic articles. In a specific embodiment, platinum and palladium are supported on an alumina support ("Pt/Pd/alumina"). More specifically, embodiments of the invention are directed to the use of molecular sieves where the individual molecular sieve particles, crystallites or agglomerates are protected by encapsulating the molecular sieve in an impervious material that prevents contact of the molecular sieve with components contained in slurry used to prepare washcoated Pt/Pd/alumina DOC or LNT catalyst. Alternatively, the molecular sieve may be impregnated with a material that fills the internal pore structure of the molecular sieve and thereby eliminates absorption and diffusion of soluble slurry components into the molecular sieve. Unwanted slurry components include precious metal, particularly Pt and Pd.

Thus, according to embodiments of the invention, the negative interaction between the molecular sieve and the platinum group metal is eliminated when the molecular sieve and platinum group metal are combined in the same coating layer by use of molecular sieve that is protected from soluble components contained in slurry used to prepare washcoated platinum group metal DOC or LNT catalyst. Protection can be accomplished in a variety of ways including the encapsulation of individual molecular sieve crystallites or larger agglomerates with an impervious material such as an organic wax or polymer. Alternatively, the molecular sieve may be impregnated with a material such as a high boiling organic compound that fills the internal pore structure of the molecular sieve and thereby eliminates absorption and diffusion of soluble slurry components into the molecular sieve. Other similar techniques can be utilized and are within the scope of the invention. In specific embodiments, both the outer and internal surface area of the molecular sieve particle (whether individual crystallites or larger agglomerates) do not come into direct contact with the liquid phase of the slurry (and soluble components dissolved therein). In particular, it is desirable to keep any soluble precious metal components in the washcoat slurry (e.g. Pt and Pd) from coming into contact with the molecular sieve. Depending on the specific method of slurry manufacture, TEM analysis of calcined and aged Pt/Pd/alumina slurry washcoat derived from a slurry comprising a mixture of Pt/Pd/alumina and molecular sieve can show a significant number of precious metal crystallites (Pt and Pd) deposited on molecular sieve particles. Since sintering of precious metal is enhanced when located on a molecular sieve due to a weak interaction with the predominantly silica surface, catalyst performance is reduced. Therefore, minimizing the contact of precious metal with the molecular sieve by use of a protecting agent is desired. Preferably, the protecting agent is an organic material that can be burned out of the molecular sieve during normal calcination of the monolith after washcoating with slurry. Alternatively, the molecular sieve can have an inorganic oxide layer deposited on the surface that traps and retains platinum group metals before it comes into contact with the molecular sieve.

A highly specific embodiment of the invention involves the use of Beta zeolite particles in the range of 1-50 um, more specifically, between 10-50 um.

Although specific embodiments of the invention are directed to the use of Beta zeolite, the concept is also valid for other zeolite or micro-porous crystalline solid compositions, particularly those with large pore openings (e.g. ZSM-12, SAPO-37, etc.). Thus any molecular sieve material having a protecting material thereon by encapsulation, coating, dispersion, or any suitable form of contact is within the scope of the present invention.

With respect to the terms used in this disclosure, the following definitions are provided.

As used herein, molecular sieves refer to materials based on an extensive three-dimensional network of oxygen ions containing generally tetrahedral type sites and having a pore distribution. A zeolite is a specific example of a molecular sieve, further including silicon and aluminum. Reference to a "non-zeolite-support" or "non-zeolitic support" in a catalyst layer refers to a material that is not a molecular sieve or zeolite and that receives precious metals, stabilizers, promoters, binders, and the like through association, dispersion, impregnation, or other suitable methods. Examples of such non-zeolitic supports include, but are not limited to, high surface area refractory metal oxides. High surface area refractory metal oxide supports can comprise an activated compound selected from the group consisting of alumina, zirconia, silica, titania, silica-alumina, zirconia-alumina, titania-alumina, lanthana-alumina, ceria-alumina, ceria-silica-alumina, lanthana-zirconia-alumina, baria-alumina, baria-lanthana-alumina, baria-lanthana-neodymia-alumina, zirconia-silica, titania-silica, and zirconia-titania.

As used herein, the term "catalyst" refers to a material that promotes a reaction. As used herein, the phrase "catalyst composition" refers to a combination of two or more materials that promote a reaction.

As used herein, the term "carrier" refers to a support that carries or supports a catalytic species. For example, refractory metal oxide particles may be a carrier for platinum group metal catalytic species.

As used herein, the term "substrate" refers to the monolithic material onto which the carrier is placed, typically in the form of a washcoat containing a plurality of carriers having catalytic species thereon. A washcoat is formed by preparing a slurry containing a specified solids content (e.g., 10-60% by weight) of carriers in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type substrate member, which is sufficiently porous to permit the passage of the gas stream being treated. Washcoats are disposed on a monolithic substrate by applying a slurry, which is mixture of solid particles and a liquid vehicle (typically an aqueous vehicle), to the substrate to form the washcoat. Once applied, the washcoat is typically dried and optionally calcined.

"Catalytic article" refers to an element in an exhaust gas treatment system that is used to promote a desired reaction. For example, a catalytic article may comprise a washcoat containing catalytic species on a substrate.

In one or more embodiments, the substrate is a ceramic or metal having a honeycomb structure. Any suitable substrate may be employed, such as a monolithic substrate of the type having fine, parallel gas flow passages extending there through from an inlet to an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, silicon carbide, zircon mullite, spodumene, alumina-silica-magnesia, zircon silicate, sillimanite, a magnesium silicate, zircon, petalite, α-alumina, an aluminosilicate and the like.

The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

"Rich gaseous streams" including rich exhaust streams mean gas streams that have a $\lambda<1.0$.

"Rich periods" refer to periods of exhaust treatment where the exhaust gas composition is rich, i.e., has a $\lambda<1.0$.

"Rare earth metal components" refer to one or more oxides of the lanthanum series defined in the Periodic Table of Elements, including lanthanum, cerium, praseodymium and neodymium. Rare earth metal components can include at least one rare earth metal selected from Ce, Pr, Nd, Eu, Nb, Sm, Yb, and La.

"Alkaline earth component" refers to one or more chemical elements defined in the Periodic Table of Elements, including beryllium (Be), magnesium (Mg), calcium (Ca), strontium (Sr), barium (Ba), and radium (Ra).

"Alkali metal component" refers to one or more chemical elements defined in the Periodic Table of Elements, including lithium (Li), sodium (Na), potassium (K), rubidium (Rb), cesium (Cs), and francium (Fr).

The catalytic articles described herein may be used as part of an exhaust gas treatment system. Thus, if the protected molecular sieves are used as part of a LNT, a DOC or integrated LNTDOC catalytic article, the catalytic article can be used in an integrated emission treatment system comprising one or more additional components for the treatment of diesel exhaust gas emissions. For example, the emission treatment system may further comprise a soot filter component. The soot filter may be catalyzed for specific functions. If the catalytic article is a DOC, the filter is typically located downstream from the filter. The LNT catalytic article may be located upstream or downstream from the filter.

In a specific embodiment, the soot filter is a catalyzed soot filter (CSF). The CSF can comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia-alumina) and/or an oxidation catalyst (e.g., a ceria-zirconia) for the combustion of unburned hydrocarbons and to some degree particulate matter. However, preferably the soot burning catalyst is an oxidation catalyst comprising one or more precious metal (PM) catalysts (platinum, palladium, and/or rhodium). In one or more embodiments, the protected molecular sieves are used to form a CSF where a PGM is utilized.

In general, any known filter substrate in the art can be used, including, e.g., a honeycomb wall flow filter, wound or packed fiber filter, open-cell foam, sintered metal filter, etc., with wall flow filters being specifically exemplified. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Specific wall flow substrates have a wall thickness of between 0.002 and 0.015 inches.

The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

It will be appreciated that an LNT will include components in addition to the platinum group metal on a refractory oxide particle and a molecular sieve. Typically, an LNT will further comprise ceria particles having an alkaline earth such as barium supported on the cerium.

Another aspect of the invention pertains to a method of making a catalytic article for the treatment of exhaust gas from an internal combustion engine containing hydrocarbons, carbon monoxide and nitrogen oxides. In an embodiment, the method includes providing protected molecular sieve particles having internal pores by contacting the molecular sieve with a protecting material selected from an organic wax encapsulating the molecular sieve particles, a polymer encapsulating the molecular sieve particles, an inorganic oxide deposited on the surface of the molecular sieve particles, or an organic compound filling the internal pores of the molecular sieve particles; mixing the protected molecular sieve particles in a slurry containing a platinum group metal on a refractory metal oxide support; and washcoating the slurry containing the protected molecular sieve particles and platinum group metal on a refractory metal oxide support in a single washcoat layer on a carrier substrate.

Still other embodiments of the invention pertain to methods of treating exhaust gas from internal combustion engines comprising flowing the exhaust gas from an internal combustion engine over the catalytic article described herein. In specific embodiments, the internal combustion engine is a lean burn engine as defined above.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A catalyst composition for the treatment of exhaust gas from an internal combustion engine containing hydrocarbons, carbon monoxide and nitrogen oxides, wherein the catalyst composition comprises an oxidation catalyst comprising a washcoat layer including a platinum group metal supported on a refractory metal oxide support and further including porous molecular sieve particles having internal pores, the molecular sieve particles protected by a protecting material selected from an organic wax encapsulating the molecular sieve particles, a polymer encapsulating the molecular sieve particles, or an organic compound filling the internal pores of the molecular sieve particles, wherein the protecting material prevents interaction of the molecular sieve particles with the platinum group metal.

2. The catalyst composition of claim 1, wherein the platinum group metal comprises platinum and palladium.

3. The catalyst composition of claim 1, wherein the internal combustion engine is a lean burn engine.

4. The catalyst composition of claim 1, wherein the molecular sieve particles consist of primary crystallites or agglomerates with a size in the range of about 1 to 70 µm.

5. The catalyst composition of claim 1, wherein the molecular sieve particles consist of primary crystallites or agglomerates with a size in the range of about 10 to 50 µm.

6. The catalyst composition of claim 1, wherein the molecular sieve particles are zeolites selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite and combinations thereof.

7. The catalyst composition of claim 1, wherein the organic wax or polymer is hydrophobic.

8. The catalyst composition of claim 1, wherein the organic wax or polymer is selected from the group consisting of cellulosics, acrylates, polyvinylpyrrolidones and combinations thereof.

9. A catalytic article for the treatment of exhaust gas from internal combustion engine containing hydrocarbons, carbon monoxide and nitrogen oxides comprising a carrier substrate having a length, an inlet end and an outlet end, an oxidation catalyst material on the carrier, the oxidation catalyst material including an oxidation catalyst comprising a washcoat layer including the catalyst composition of claim 1.

10. The catalytic article of claim 9, wherein the catalytic article utilizes a single washcoat layer.

11. The catalytic article of claim 9, wherein the article is selected from the group consisting of a lean $NO_x$ trap, diesel oxidation catalyst and a catalyzed soot filter.

12. A method of making a catalytic article for the treatment of exhaust gas from an internal combustion engine containing hydrocarbons, carbon monoxide and particulate matter, the method comprising:
providing protected molecular sieve particles having internal pores by contacting the molecular sieve with a protecting material selected from an organic wax encapsulating the molecular sieve particles, a polymer encapsulating the molecular sieve particles, or an organic compound filling the internal pores of the molecular sieve particles;
mixing the protected molecular sieve particles in a slurry containing a platinum group metal on a refractory metal oxide support; and
washcoating the slurry containing the protected molecular sieve particles and platinum group metal on a refractory metal oxide support in a single washcoat layer on a carrier substrate.

13. The method of claim 12, wherein the molecular sieve particles consist of primary crystallites or agglomerates with a size in the range of about 1 to 70 µm.

14. The method of claim 12, wherein the molecular sieve particles consist of primary crystallites or agglomerates with a size in the range of about 10 to 50 µm.

15. The method of claim 12, wherein the molecular sieve particles are zeolite particles selected from the group consisting of faujasite, chabazite, clinoptilolite, mordenite, silicalite, zeolite X, zeolite Y, ultrastable zeolite Y, ZSM-5, ZSM-12 e, SSZ-13, SAPO-5, SAPO-37, offretite, Beta zeolite and combinations thereof.

16. The method of claim 12, further comprising the step of burning out protecting material from the molecular sieve particles.

17. The method of claim 12, wherein the organic wax or polymer is hydrophobic.

18. The method of claim 12, wherein the organic wax or polymer is selected from the group consisting of cellulosics, acrylates, polyvinylpyrrolidones and combinations thereof.

19. The method of claim 12, wherein the platinum group metal is platinum and palladium.

20. A method of treating exhaust gas from a lean burn engine containing hydrocarbons, carbon monoxide and nitrogen oxides comprising flowing the exhaust gas over a catalytic article in accordance with claim 9.

21. The method of claim 20, wherein the article is selected from the group consisting of a lean $NO_x$ trap, diesel oxidation catalyst and a catalyzed soot filter.

* * * * *